(12) United States Patent
Williams

(10) Patent No.: US 7,539,748 B2
(45) Date of Patent: May 26, 2009

(54) DATA TRANSFER APPLICATION MONITOR AND CONTROLLER

(75) Inventor: Christopher Pierce Williams, Potomac Falls, VA (US)

(73) Assignee: Time Warner Cable, a division of Time Warner Entertainment Company, L.P., Stamford, CT (US)

( * ) Notice: Subject to any disclaimer, the term of this patent is extended or adjusted under 35 U.S.C. 154(b) by 1480 days.

(21) Appl. No.: 10/439,955

(22) Filed: May 16, 2003

(65) Prior Publication Data

US 2004/0228277 A1    Nov. 18, 2004

(51) Int. Cl.
 *G06F 15/173* (2006.01)
 *G06F 15/16* (2006.01)

(52) U.S. Cl. ............ 709/224; 709/223; 709/225; 709/226; 709/229; 709/232; 709/240

(58) Field of Classification Search ......... 709/223–226, 709/229, 232, 240
See application file for complete search history.

(56) References Cited

U.S. PATENT DOCUMENTS

| | | | |
|---|---|---|---|
| 5,029,164 A | 7/1991 | Goldstein et al. | |
| 5,799,002 A | 8/1998 | Krishnan | |
| 5,862,338 A | 1/1999 | Walker et al. | |
| 5,943,232 A | 8/1999 | Gehi et al. | |
| 5,996,013 A | 11/1999 | Delp et al. | |
| 6,006,269 A | 12/1999 | Phaal | |
| 6,009,473 A | 12/1999 | Lowe | |
| 6,055,564 A | 4/2000 | Phaal | |
| 6,055,571 A | 4/2000 | Fulp et al. | |
| 6,125,397 A | 9/2000 | Yoshimura et al. | |
| 6,134,216 A | 10/2000 | Gehi et al. | |
| 6,178,448 B1 | 1/2001 | Gray et al. | |
| 6,222,856 B1 | 4/2001 | Krishnan et al. | |
| 6,226,627 B1 | 5/2001 | Polak | |
| 6,230,203 B1 | 5/2001 | Koperda et al. | |
| 6,282,206 B1 | 8/2001 | Hindus et al. | |
| 6,282,208 B1 | 8/2001 | Bowcutt et al. | |
| 6,308,328 B1 | 10/2001 | Bowcutt et al. | |
| 6,343,085 B1 | 1/2002 | Krishnan et al. | |
| 6,360,270 B1 | 3/2002 | Cherkasova et al. | |
| 6,411,602 B2 | 6/2002 | Schoenblum et al. | |
| 6,424,993 B1 | 7/2002 | Weber | |
| 6,442,706 B1 | 8/2002 | Wahl et al. | |
| 6,473,793 B1 * | 10/2002 | Dillon et al. | 709/223 |
| 6,510,162 B1 | 1/2003 | Fijolek et al. | |
| 6,532,454 B1 | 3/2003 | Werbos | |
| 2003/0088529 A1 * | 5/2003 | Klinker et al. | 706/3 |

* cited by examiner

*Primary Examiner*—Patrice Winder
*Assistant Examiner*—Thomas Duong
(74) *Attorney, Agent, or Firm*—The Marbury Law Group, PLLC

(57) ABSTRACT

The present invention teaches methods and systems for monitoring and controlling bandwidth usage between an internal local area network and an external network. By providing controls from inside the external network connectivity point, greater detail in bandwidth control is possible. This in turn leads to less restrictive bandwidth restricting algorithms. Bandwidth restricting algorithms include various bandwidth limiting techniques. One such technique uses prioritized data transfer limits applied on an application, process or network interface basis. Another technique uses a configurable weighting factor for real-time prioritization of data traffic. Other techniques incorporate quality of service or model predictive control based bandwidth limiting.

13 Claims, 7 Drawing Sheets

UpLoads

Downloads

Total

DATA TRANSFER APPLICATION MONITOR AND CONTROLLER

FIELD OF THE INVENTION

The present invention relates to methods allowing internet service subscribers to monitor and control the amount of data transferred to and from their customer premises equipment (CPE) based on various selectable criteria including, for example, by port address, by process and by application.

BACKGROUND OF THE INVENTION

Internet use involves accessing one or more remote Internet servers for purposes of downloading information or digital files as well as uploading files and messages. Access is accomplished by connecting a terminal or terminal means to a carrier network. Terminal means include traditional terminals, personal computers (PC), game console devices equipped with network connectivity and voice over internet protocol (VoIP) telephone systems. Additional devices are used between the terminal means and the carrier network. Such devices include local networking electronic devices as well as electronic devices that connect a local network or terminal means to an external network. Examples of local networking devices include network hubs, network switches, network bridges, network interface cards, and the like. Examples of devices to connect a local network to an external network include routers, cable modems, DSL modems, dial-up modems, and the like.

As used herein, Customer Premises Equipment (CPE) includes terminal means (such as terminals, personal computer, game consoles or VoIP telephone system), local networking devices and electronic devices to connect a local network to an external network such as a carrier network.

As used herein, a "Carrier Network" generally refers to a computer network through which users communicate with various service providers (e.g. Internet web servers). The Carrier Network may be an external network extending from the local network to other external networks, for example, the Internet or "world wide web". The Carrier Network is maintained by a "Carrier," which also may serve as a service provider for certain services. For example, a Carrier or a related entity may serve as an Internet service provider (ISP).

Carrier Networks include "Shared Access Carrier Networks," in which data of multiple users are conveyed together over a shared communications medium between the users and the Intermediate Network, and "Dedicated Connection Carrier Networks," in which data of each user is conveyed alone between the user and the Intermediate Network and are not combined with data of other users. One of the most prevalent Shared Access Carrier Networks today is found in the Data-Over-Cable (DOC) Network, which includes the traditional network constructed from coaxial cable and the hybrid fiber coaxial (HFC) network constructed with both fiber optical cabling and coaxial cable. Other Shared Access Carrier Networks include wireless and digital subscriber line (xDSL) networks (the xDSL lines typically being aggregated onto an oversubscribed backhaul trunk into the Intermediate Network, with the trunk defining the shared communications medium).

Network carriers and their equipment providers have adopted industry standards in order to increase interchangeability and reduce manufacturing costs for network hardware. For example, DOC Carriers have adopted industry standards such as the Data Over Cable Service Interface Specification (DOCSIS). DOCSIS version 1.0 was issued in 1997 with hardware devices being certified starting in 1999. DOCSIS version 1.1 replaced version 1.0 in 1999-2001 and now accounts for the bulk of installed DOC network equipment. Although released, DOSIS version 2.0 is not yet widely available. As a result, networks conforming to DOCSIS (i.e. DOCSIS-compliant) use DOCSIS version 1.1 hardware in most cases.

FIG. 1 illustrates an example of such a typical DOCSIS-compliant network. Data packets are transmitted in a downstream direction from a cable modem termination system (CMTS) 21, which is located in headend 31 (or distribution hub) of a Carrier, over a coaxial cable 22 to respective cable modems (CMs) 14 of user local networks. CMs may attach a single terminal means to the DOCSIS-compliant network or may further comprise electronics that function as a network hub (e.g. Ethernet hub) or router function. Many times, the CMs are provided with "firewall" software that is used to block undesirable accesses to the attached local network.

All of CMs 14 are attached by the coaxial cable 22 to the CMTS 21 in an inverted tree configuration, and each CM 14 connected to the coaxial cable 22 listens to all broadcasts from the CMTS 21 transmitted through the coaxial cable 22 for data packets addressed to it, and ignores all other data packets addressed to other CMs 14.

Theoretically, a CM 14 is capable of receiving data in the downstream direction over a 6 MHz channel with a maximum connection speed of 30-40 Mbps. Data packets also are transmitted in the upstream direction over a 2 MHz channel by the CMs 14 to the CMTS 21 typically using time division multiplexing (TDM) and at a maximum connection speed of 1.5-10 Mbps (up to 30 Mbps when DOCSIS version 2.0 is available)

The headend 31 in the DOCSIS Network includes a plurality of CMTSs, with each CMTS supporting multiple groups of CMs each connected together by a respective coaxial cable. Each such group of CMs connected to a CMTS defines a Shared Access Carrier Network, with the coaxial cable in each representing the shared communications medium. This arrangement of a group of CMs connected to a CMTS by a coaxial cable is referred to herein as a "Cable Network." Accordingly, the DOCSIS network includes a plurality of Cable Networks 20 originating from CMTSs at the headend 31 of the Carrier, with a particular Cable Network 21 being illustrated in an expanded view in FIG. 1. The DOCSIS network may also include multiple headends, for example, 31, 32 and 33.

Data transmission over a DOCSIS network can be thought of as a downstream data path and an upstream data path. Downstream paths normally refer to transmission from a web server to a terminal means, for example a terminal 11 or personal computer 12. Upstream data transmission is the opposite with data originating in terminal 11, personal computer 12 or other terminal means. For purposes of this invention, customer premises equipment 20 includes the cable modems 14, terminals 11, personal computers 12, other terminal means and related interconnections, power sources, etc.

The more general case of customer premises equipment attached to an external network is illustrated in FIG. 2. Terminal means 15 are interconnected to a local area network hub 16 over compatible wiring or fiber optic links. In turn, LAN hub 16 is connected to an external connectivity electronics 17 that attaches to the external network 18 to become part of carrier network 28. Telephone systems for voice over Internet 15*b* may be attached to a media terminal adapter 15*a* that is connected to LAN hub 16. It is also common for the media terminal adapter 15*a* to be integrated into VoIP telephone system 15*b* and as a further alternative, media adapter 15*a* may be configured for direct connection to external network 18.

FIG. 3 illustrates a special case of a DOCSIS compatible network. Cable modem and local area network hub have been combined into a single cable modem hub 19. Such configurations have become particularly popular recently and include both wired and wireless (short distance FM) connections to terminal means. The telephone system 15*b* for VoIP is shown connected to the cable modem via the media terminal adapter 15*a*.

The amount of data transmitted between the local and external networks is commonly termed "bandwidth." Recently, carrier networks as well as Internet Service Providers (ISPs) have begun charging customers on the basis of the bandwidth they consume. Consumption is bi-directional and totals the sum of upload and download data transmissions.

Bandwidth charges are of two types: totalized bandwidth charges and bandwidth rate charges. In totalized bandwidth charges, a carrier or ISP will charge a customer based upon the total number of bytes transmitted or received by a customer during a billing cycle. For example, a charge may be based upon the number of gigabytes transmitted per month.

In contrast, bandwidth rate charges are determined by the speed of bandwidth used or reserved for a client. For example, a customer may pay for 10 megahertz of reserved bandwidth from a particular ISP or carrier. Customers can be either limited to the amount of reserved bandwidth, or in the alternative, be allowed to exceed the reserved bandwidth rate. In this second alternative, the ISP or network carrier will apply a surcharge for the bandwidth rate exceeding the reserved limit.

When the subscriber receives a bill from the network carrier, it is important that the subscriber has a way to reconcile against that bill and modify their behavior based on "real-time" knowledge of when they are exceeding certain bandwidth limits. It will also be extremely valuable to control this data transfer based on configurable options that provide the flexibility the subscriber would desire.

Cable networks provide a particular dilemma when allocating bandwidth charges. Although many cable network carriers do not charge retail customers for bandwidth, they may incur bandwidth charges from other external networks or ISPs. As a result, many cable network customers consider they have "free bandwidth" up to the limit of the speed of the attaching cable modem. Similarly, users of digital subscriber line networks (xDSL) may often pay a single charge per connection and customers consider they have free bandwidth up to the limit of the DSL modem.

Free bandwidth has encouraged the rapid growth of peer-to-peer (P2P) networks. P2P networks make use of customer computing platforms to provide virtual servers. Customers, when not faced with additional bandwidth charges may feel free to allow their computing platforms to be utilized in this manner. In addition, cable networks may be configured with customer computing platforms always actively connected to the external network. The virtual servers act as data repositories that can be easily accessed from non-local terminal means.

One common use of P2P networks is in webcasting. Although a webcaster could broadcast messages to all receiving customers, such an arrangement would result in the webcaster absorbing all bandwidth charges. Instead the webcaster will use P2P networks, taking advantage of "free" bandwidth provided by cable network customers. Some webcasters have announced saving 60-75% of bandwidth charges by using P2P networks.

Another use of P2P networks is for freely shared file repositories. Popular for these repositories are sharing of music or video programs, including MP3 formatted digital music files.

P2P networks rely upon the virtual server application programs that permit and support file sharing from the external network to a local network connected computing platform. Popular virtual server application programs include KaZaa, Grokster, Morpheus, Gnucleus, BearShare, iMesh, LimeWire, eDonkey, BadBlue, WinMX, AudioGalaxy, Blubster, Filetopia, Net Brillant, Phex, Shareaza, Splooge, Swapper, Swaptor, Wippit and the like.

Many of the P2P networks further encourage users to provide file sharing by including an embedded "participation level." For example, KaZaa users with higher participation levels receive and download files on a faster basis than users with lower participation. The application assigns user participation levels by determining the amount of megabytes of files external users have accessed. As a result, a KaZaa user sharing 10 megabytes will have a lower participation level than a user sharing 10 gigabytes. Furthermore, many P2P users while generally aware of how much data they have downloaded to their computer, they may not be aware of how many public users are connecting to their system transferring files as well.

This burgeoning P2P network traffic is causing ever increasing concerns amongst carrier networks. In 2001, Cornell University reported that 60% of their external network traffic was related to P2P sharing, with 64% of the P2P traffic being uploads.

Carrier networks and ISPs are responding to P2P by imposing significantly higher bandwidth charges. However higher bandwidth charges is not a panacea as it both discourages customer P2P bandwidth and encourages P2P bandwidth use by webcasters.

Many ISPs also offer instant messenger applications that transmit messages to identified destinations within a short time period. Instant messenger applications are offered by Microsoft Network (MSN IM), Yahoo (Yahoo Messenger), Road Runner (RR Messenger), America Online (AOL IM), ICQ Messenger, Jabber Messenger and the like. Typical bandwidth usage for instant messaging is modest. However, users may have strong desire to reserve bandwidth for instant messaging on a high priority basis.

Customers are now finding it desirable to lower their bandwidth charges while having the least restriction on their bandwidth usage. In order to do so, customers require a means to monitor their bandwidth and take actions to reduce bandwidth to acceptable limits with minimum impact upon their users.

Thus what would be useful is a system and method by which customers are able to monitor and control local area network bandwidth consumed from outside networks. In the past, control of bandwidth has taken place an "enterprise" basis. Unfortunately, enterprise based approaches often create significant interference with customer critical applications and are less than optimum. Enterprise bandwidth control, of necessity, resides outside the connectivity interface between the local and external networks. As a result it cannot optimize to the same degree of detail that a local bandwidth controller is able.

As is demonstrated below, applicants have developed a localized bandwidth monitor and controller that is flexible yet can optimize bandwidth to a detail, not previously available.

BRIEF SUMMARY OF THE INVENTION

The invention is an application designed to track and control a carrier network subscriber's bandwidth usage on an application, user, port, application category, protocol, inbound vs. outbound, and/or peak vs. non-peak basis. The application is designed to provide functionality to the user for allowing them to first monitor bandwidth usage and then limit bandwidth uses on a detailed priority basis. Bandwidth usage monitoring may also incorporate automatically initiated alarms. Alarms may, for example, send an audible signal or electronic message to a user or "master" user.

Various embodiments of the invention incorporate different bandwidth limiting techniques. One such technique uses prioritized threshold limits applied on an application, process or network interface basis. Another embodiment of the invention uses a weighting factor for real-time prioritization of data traffic. Other embodiments incorporate model based or time based bandwidth limiting. Bandwidth limiting techniques are performed on an application, user, port, application category, protocol, inbound vs. outbound and/or peak vs. non-peak basis.

Threshold limits or trigger levels are determined from subscriber configuration of control curves. Control curves may be generated on an application, user, port, application category, protocol, inbound vs. outbound and/or peak vs. non-peak basis. Control curves may be a single value, or may vary during the network carrier billing cycle. Desired bandwidth usage policies may be enforced by configuring appropriate control curve settings.

DETAILED DESCRIPTION OF THE INVENTION

Figure 1:
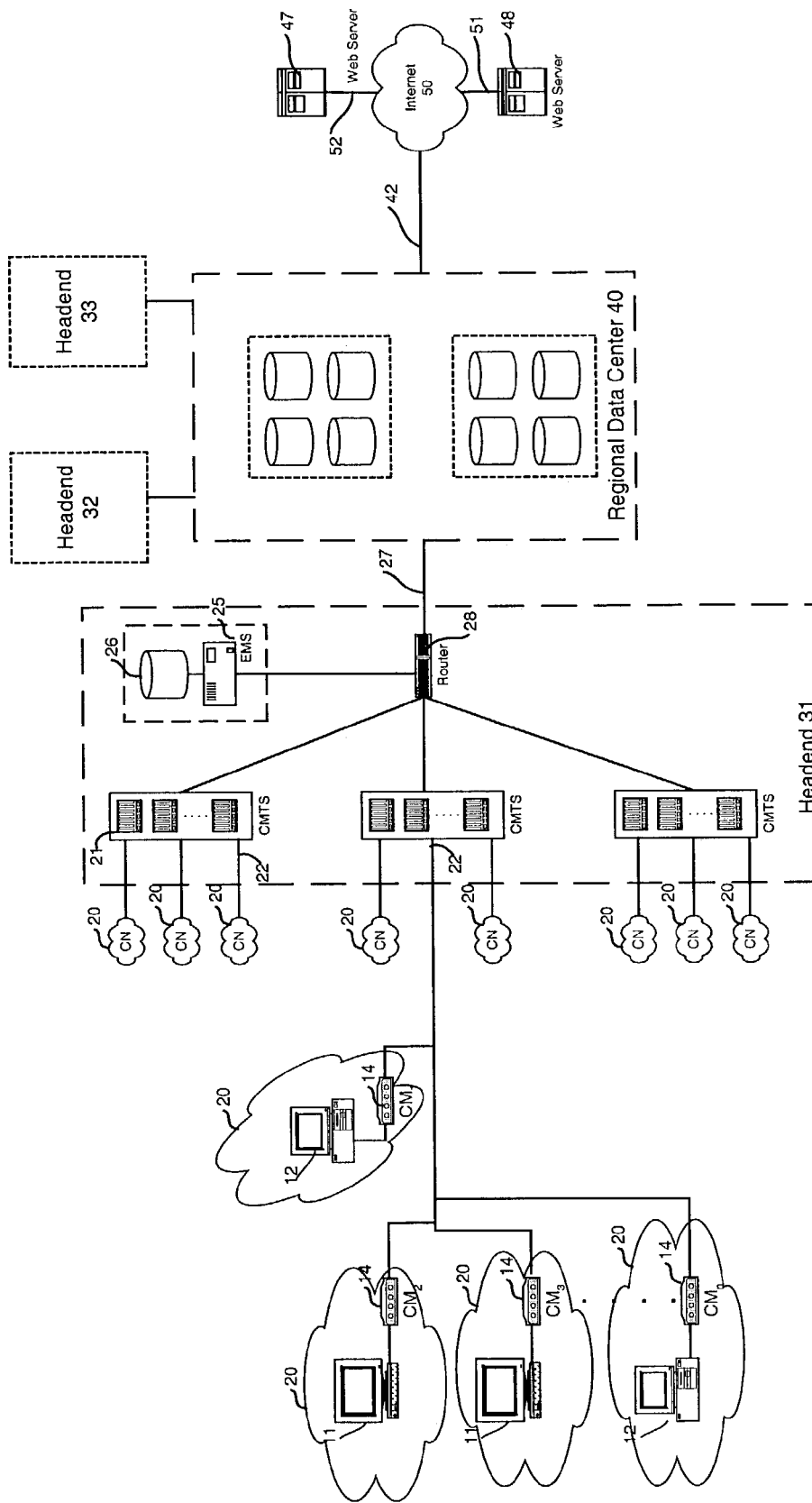
FIG. 1 illustrates a typical network as known in the art and using cable network connectivity.
Figure 2:
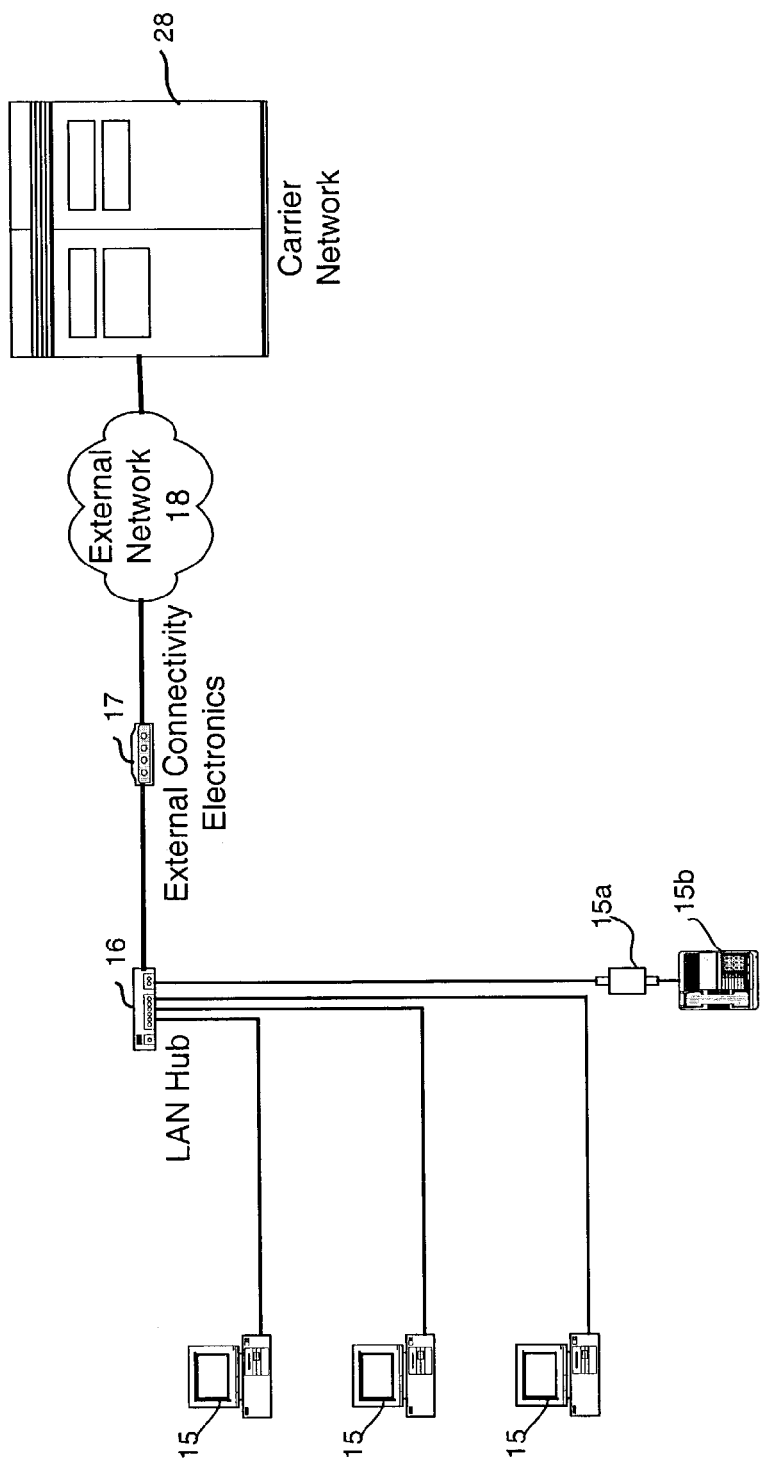
FIG. 2 is a simplified schematic illustrating a generalized network.
Figure 3:
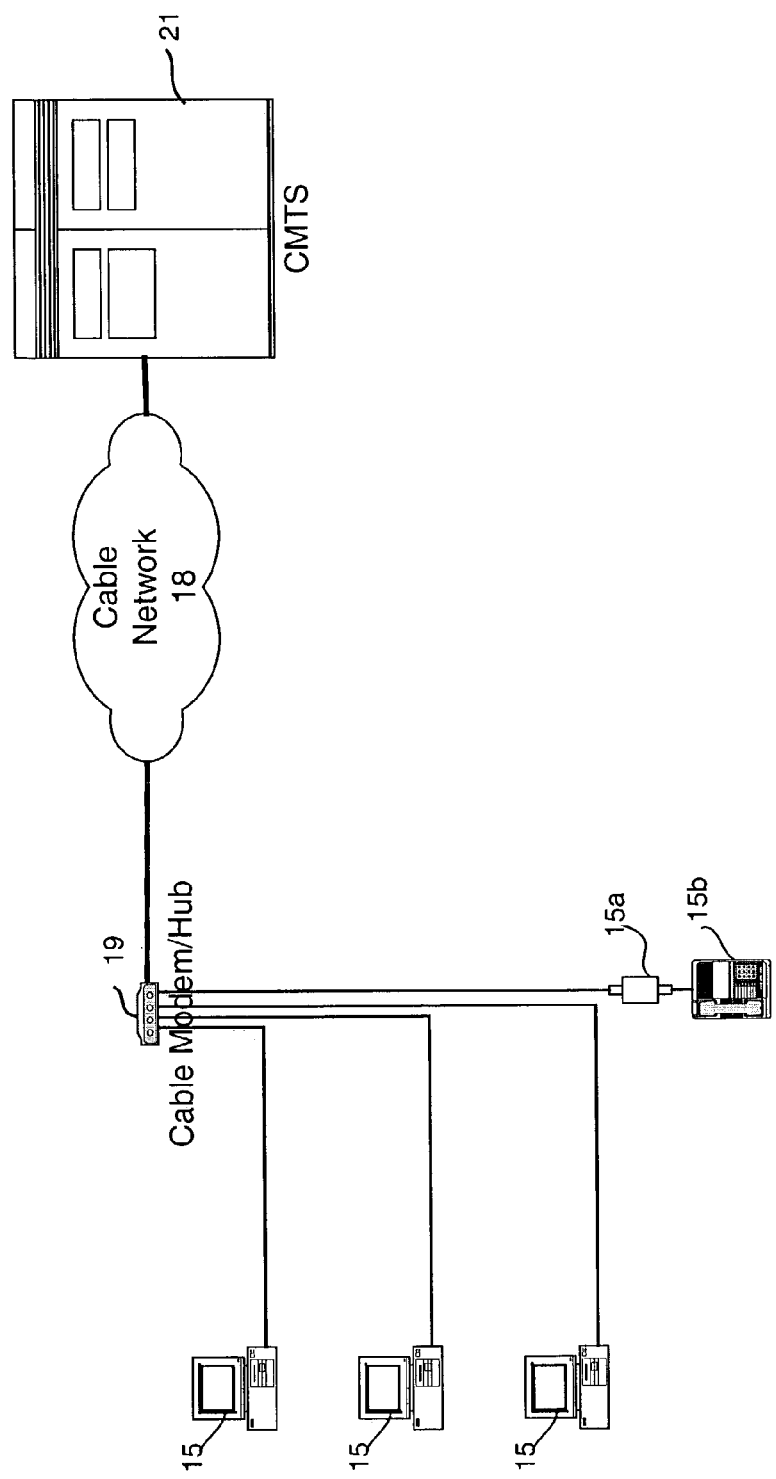
FIG. 3 is a simplified schematic illustrating a combined cable modem/hub.

The invention is an application designed to track and control a carrier network subscriber's bandwidth usage on a port, process and/or application basis. The application is designed to provide functionality to the user allowing them to first monitor bandwidth usage and then limit bandwidth uses on a detailed priority basis. The invention comprises a bandwidth monitoring component and a bandwidth controlling component.

The bandwidth monitoring component of the present invention is distinguished from other bandwidth monitors in that it tracks bandwidth to a greater degree of detail. Traditional bandwidth monitors rely upon hardware counters of data transmission. In contrast, the present invention logs carrier network transmissions on a software application level, as well as a hardware level. Each terminal means will run an independent data monitor. The independent data monitors, in turn, at some convenient interval forward monitoring results to a master data monitor. In this fashion, the bandwidth monitoring component has the following features:

i. The data transferred (e.g. packets) is identified, counted and logged by communications port, by process, by user and by application.

ii. The monitoring component may preferably also provide functionality to detect multiple terminal means on the customer side of the external connectivity electronics (e.g. cable Modem/DSL modem). In this fashion all terminal means are detected and the bandwidth monitoring applications are synchronized in order to keep an accurate count of each terminal means data transfer.

iii. The master bandwidth monitoring component may also preferably detect whether or not other terminal means on the customer internal network have a corresponding bandwidth monitoring component loaded. The master bandwidth monitoring component is then able to provide alarms, and/or auto-launch a monitoring component on the "rogue" terminal means.

iv. The monitoring component is preferably configurable for billing periods based on customer input or network carrier billing cycle.

v. The monitoring component may preferably also upload and import a monthly bandwidth usage file supplied by the network carrier. The uploaded file provides a convenient means to compare and reconcile recorded bandwidth use.

vi. The monitoring component preferably presents real-time graphical representation of data transfer. Examples include one or more of the following: plots and summary pie charts identifying data transfer by user, port, application category, protocol and application.

vii. The monitoring component may preferably be configured by the user to log detailed or summary information, or both, about data transfers. Restricting data logging to summary information reduces data size and computational overhead. Logging to a detailed level provides easier troubleshooting for the subscriber. One further approach is to initially use detailed logging, then switch to summary data logging after initial network connectivity problems are resolved.

viii. The monitoring component may also provide for automatic generation of alarms. Alarms may either generate an audio tone or an electronic message that is transmitted to the subscriber. Alarms may be configured to correspond to control curve points or a preset above or below the control curve. For example, a subscriber may configure alarms at 90% of the bandwidth control curve limit.

Figure 4:
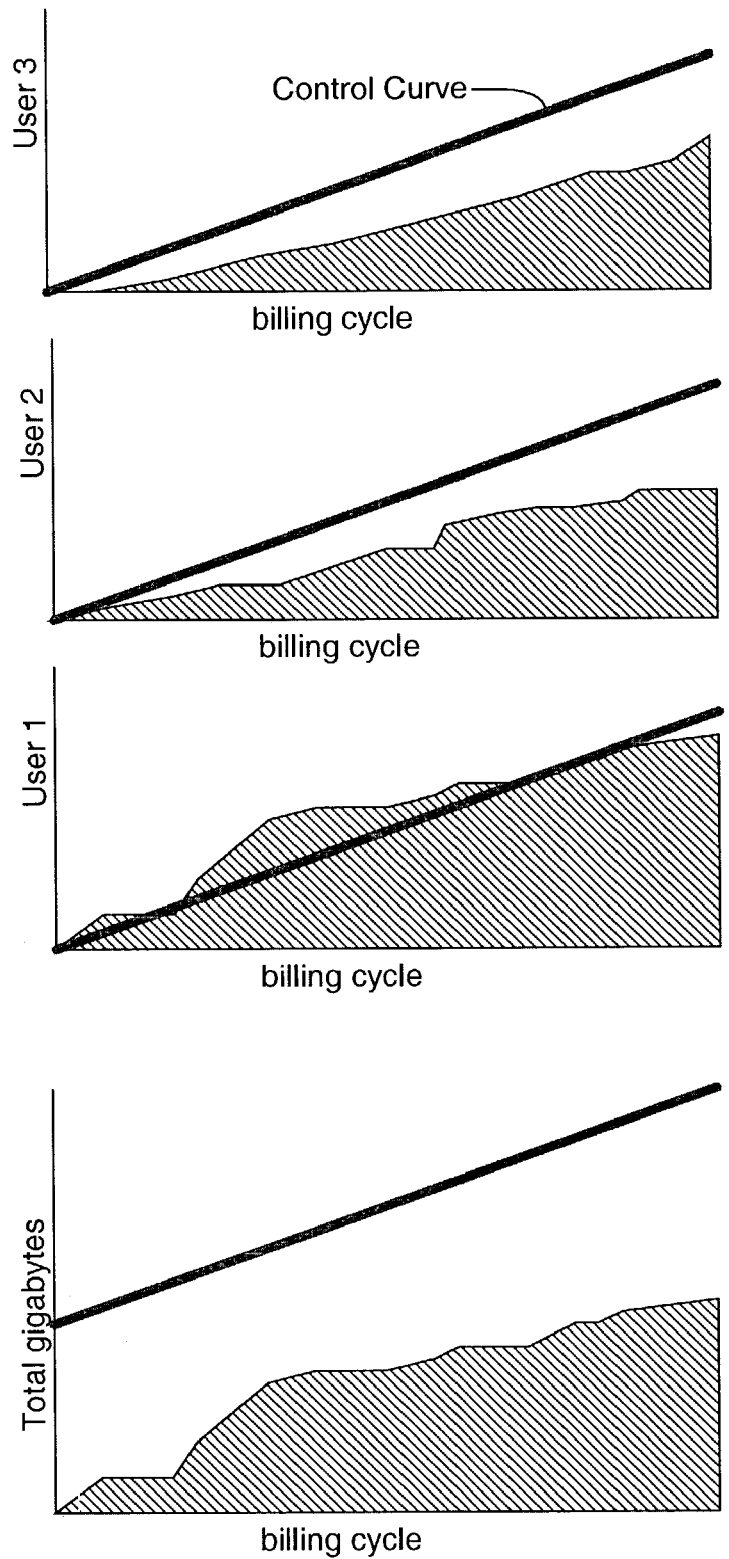
FIG. 4 illustrates typical plots of bandwidth usage on a per user basis.
Figure 5:
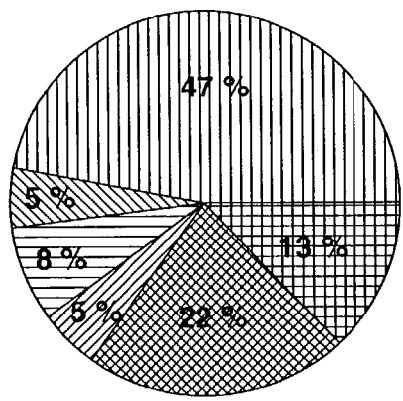
FIG. 5 illustrates pie chart plots of bandwidth usage on a per application category basis.
Figure 5:
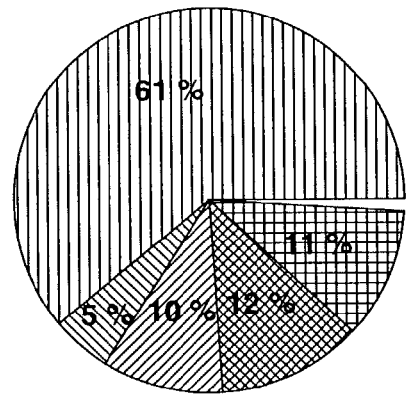
Figure 5:
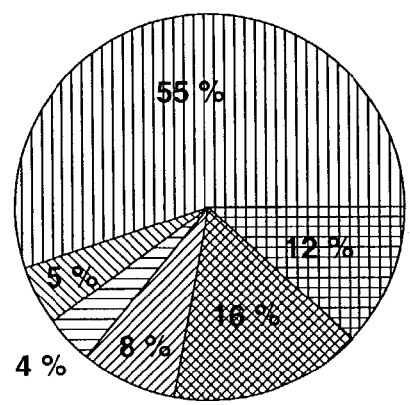
Figure 5:
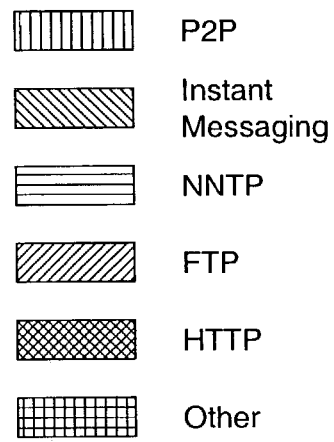
Figure 6:
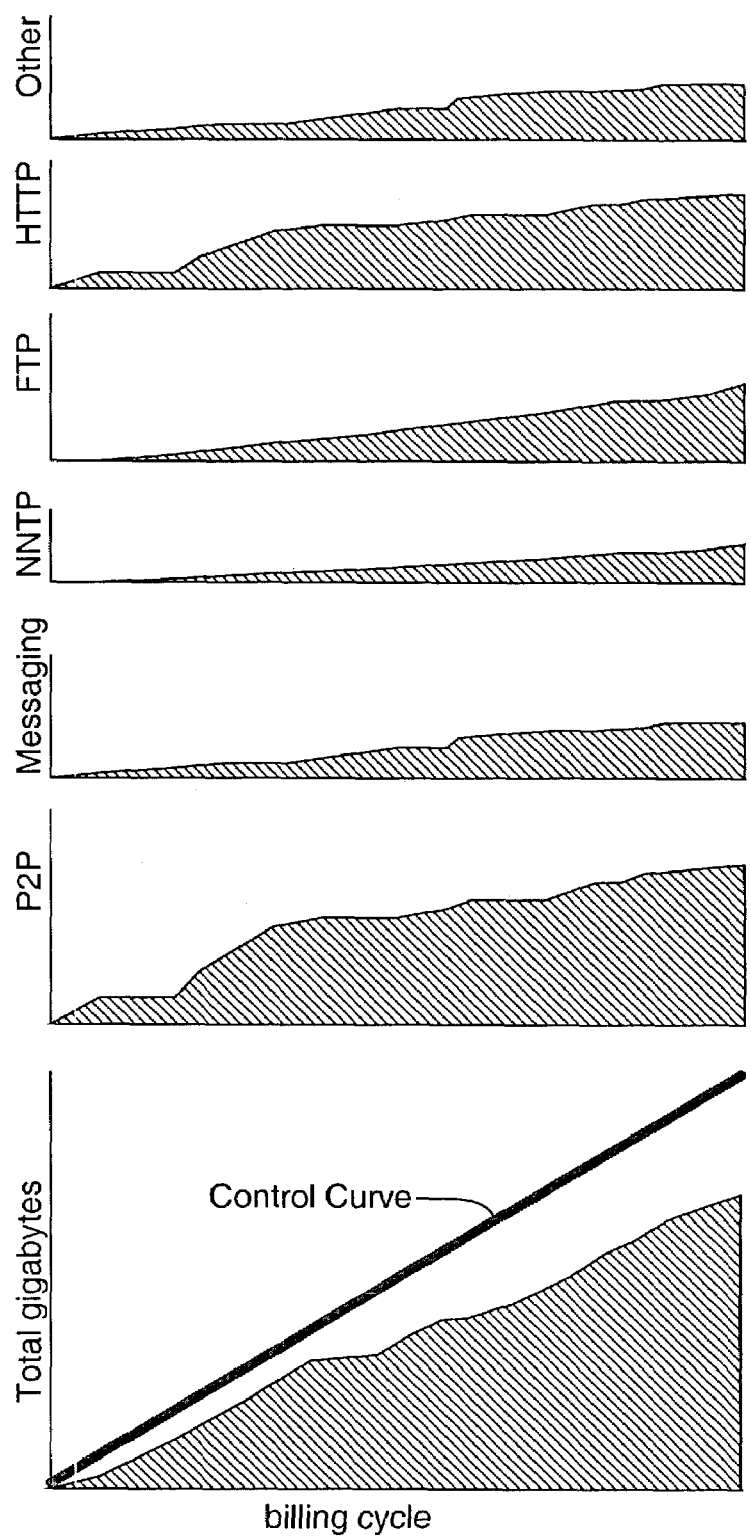
FIG. 6 illustrates typical plots of bandwidth usage on a per application category basis.

FIG. 4, FIG. 5 and FIG. 6 illustrate various embodiments of real-time graphical representation of data transfers. FIG. 4 illustrates how the data transfers for three individual users are first detailed by user and then summarized into a plot of total bandwidth use. The ordinate axis is illustrated as the billing cycle. This illustration is not be construed upon the invention, as other ordinates are easily used (e.g. fiscal year, multiple calendar months, and the like).

In contrast to the representation by user, FIG. 5 and FIG. 6 illustrate the amount of data transfer associated by category of Internet service accessed. The pie charts of FIG. 5 distinguish data packets transferred as a function of type and source. When the terminal means is the source, the data is associated to uploads. When data originates in a source external to the local area network or terminal means, it is associated to downloads. For purposes of reconciling data transfer counts with those of the network carrier, intra-LAN data packets must be excluded from the counts.

FIG. 5 identifies five common data types, with the remainder associated to the "other" category. As used in FIG. 5 and FIG. 6, "P2P" refers to peer-to-peer data transfers; "NNTP" refers to "network news transfer protocol" data packets; "FTP" refers to "file transfer protocol" data packets; and "HTTP" refers to "hypertext transfer protocol" data packets. Note that webcasting NNTP packets are normally only downloads, and this is consistent with the pie charts illustrated in FIG. 5.

The graphical representations of FIG. 6 show data packet counts by type. In addition, the total of data packets is illustrated along with a "control curve." The control curve represents the target for the maximum number of data packets transferred over the course of a billing cycle. Control curves are discussed further below. By separating data into types of data, users can configure control priorities by type. Further detail may also be provided by the invention. For example, the graphical representations of FIG. 6 can be related to individual users, to uploads or to downloads.

In addition to the monitoring component, the invention comprises a bandwidth controlling component. The controlling component compares the value for total data transmitted against a "control curve" and then initiates an appropriate controlling action. As used herein "control curve" denotes a series of maximum bandwidth setpoint values, with each value associated with a given time in the billing cycle. Preferably, the control curve provides for continuity. For example, a presently designated value will be kept active until replaced with a new value.

The values of a control curve may be plotted against time to allow for visualization. FIG. 7A through FIG. 7F illustrate examples of such plots of control curves.

Figure 7A:
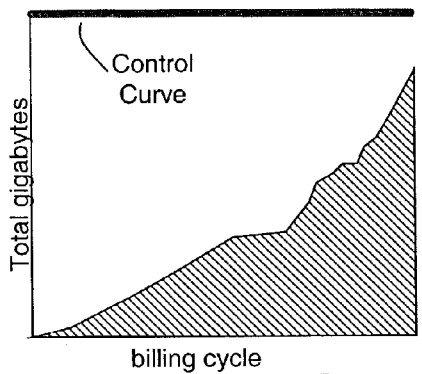
FIG. 7A through FIG. 7F illustrate various examples of a control curve.

Traditional controlling means use a single fixed control curve, such as illustrated in FIG. 7A. In FIG. 7A, a maximum allowed data packets is configured and does not change over the course of the network carrier's billing cycle. The effect of such a fixed control curve is that bandwidth may be consumed in the early portions of the billing cycle, leaving too little bandwidth toward the end of the billing cycle.

Figure 7B:
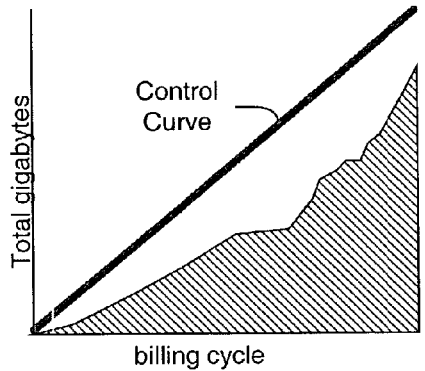

At the opposite extreme, a control curve may be configured as illustrated in FIG. 7B and is linearly proportioned for the duration of the billing cycle. In this example, the bandwidth controlling component will conserve bandwidth to values equal the remaining portion of billing cycle. However, FIG. 7B is more restrictive-than required. Unless bandwidth consumption is perfectly stable, unused amounts of bandwidth from drops in usage are not available to accommodate earlier spikes in bandwidth use.

Figure 7C:
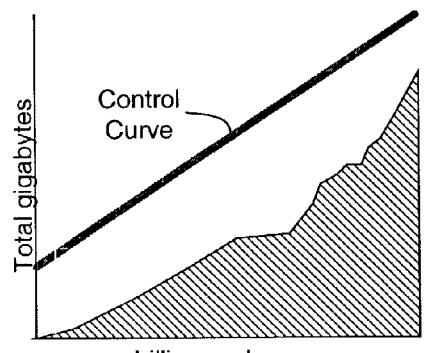
Figure 7D:
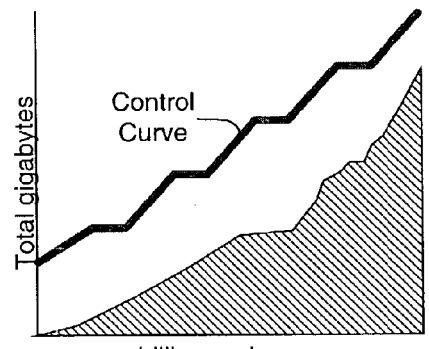

FIG. 7C through FIG. 7F accommodate early bandwidth spikes by incorporating an elevated zero time allowance. FIG. 7C is an example of a linear control curve with an elevated zero time allowance of approximately 25%. FIG. 7D illustrates how non-use bandwidth periods can be incorporated. FIG. 7D may be used, for example, by commercial users that are closed during particular periods of the billing cycle. The horizontal portions of the control curve correspond to the closed periods. FIG. 7D illustrates four closed periods, as is expected of a commercial user closed each Saturday and Sunday.

Figure 7E:
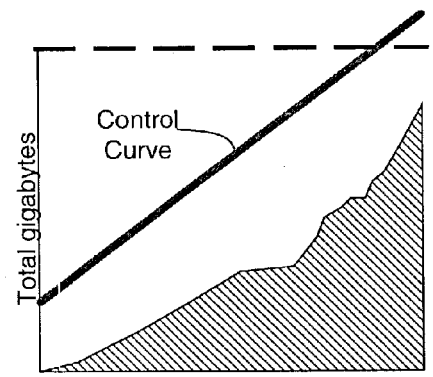

In another example, FIG. 7E illustrates extending the control curve beyond the target maximum bandwidth. This allows a nominal amount of overage, for example 10%. By allowing an overage, the user can minimize use restrictions throughout the billing cycle. With the control curve of FIG. 7E the risk is that high usage at the end of the billing cycle may result in overage charges. Users may be willing to accept this risk if the overage charges are modest or if overage is unlikely and the least restrictive use restriction is desired.

Figure 7F:
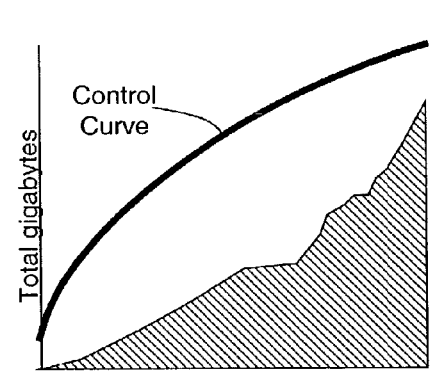

While FIG. 7A through FIG. 7E illustrate linear control curves, this should not be considered limiting. For example, FIG. 7F illustrates an exponential or polynomial control curve. Selecting the proper curve form may give advantages to users with particular bandwidth usage patterns. In general, non-linear control curves such as illustrated in FIG. 7F are less preferred. The reason is that users are less likely to understand needed bandwidth reduction when remaining bandwidth per day is constantly changing.

As disclosed above, a fixed control curve (e.g. FIG. 7A) is generally less preferred. One notable exception is for the case of an abbreviated or short billing cycle. For example, a subscriber may request a limited duration high-speed data transmission session. This may occur, for example, for a two hour gaming session with eight gigabytes of data transfer included. In this case, it is preferred to use a fixed control curve set at eight gigabytes. As used herein, "abbreviated billing cycle" refers to billing cycles of less than eight calendar days. As used herein, "short billing cycle" refers to billing cycles of less than 25 hours duration. As used herein, "very short billing cycle" refers to billing cycles of less than five hours duration.

Bandwidth controlling actions available for the controlling component of the invention includes one or more of the following controlling techniques: (1) prioritized bandwidth limiting on an application, user, process or network interface basis; (2) weighting factor prioritized bandwidth limiting applied on an application, user, process or network interface basis; (3) bandwidth limiting applied on an application, user, process or network interface basis for configured peak load periods; (4) time based predictive smoothing induced bandwidth limiting; and (5) model based predictive bandwidth limiting.

Methods of bandwidth limiting are known in the art and vary according to the simplicity or complexity available in the terminal means and external connectivity means. Such methods include blocking of data transfers (e.g. gate controllers), lower quality of service designation for lower priority bandwidth use, induced time delay for lower prioritized data transfers, and the like. The following examples illustrate how some of these enumerated methods may be combined. However, the invention is only limited by the methods and techniques for bandwidth limiting known by those skilled in the art and as practically limited by hardware and software components and features available.

EXAMPLE

Prioritized Bandwidth Limiting

In the case of a single user, the user configures a priority table identifying higher priority to lower priority of categories of external network data transfers (e.g. Internet traffic). Table 1 illustrates how such categories can be prioritized. Preferably data transfers are also prioritized by upload and download process. Once prioritized, data transfer is blocked according to the configured prioritization.

TABLE 1

Single User Configured Priority

| Application Category | Upload Priority (0-10) | Download Priority (0-10) |
| --- | --- | --- |
| HTTP | 9.5 | 10 |
| FTP | 5 | 8 |
| Instant Messaging | 7 | 7 |
| P2P | 2 | 5 |
| NNTP | 1 | 4 |
| Other | 3 | 3 |

By using a bandwidth control curve, the present invention continuously increments the amount of unused bandwidth. With this example, data transfer is permitted up to the current control curve value. Data transfer is permitted starting with the highest priority application and ending with the lowest priority application.

The accumulated data transfer is compared to the control curve. When accumulated data transfer is equal or lower than the control curve, then additional data transfer is enabled. In contrast, when accumulated data transfer equals the Control curve, data transfer is blocked. "Available bandwidth" at any moment in time is the difference between the control curve value and the accumulated data transfer value.

With the passage of time, the control curve will increment thereby increasing available bandwidth. Higher prioritized data transfers are first to consume the available bandwidth. When all higher data transfers are satisfied, then lower priority uses are allowed to consume remaining available bandwidth.

The control curve will typically be reset at the beginning of each billing cycle. Resetting the control curve, places an initial value corresponding to the "zero time" value. Once reset, the control curve automatically begins to increment in accordance with its configuration (see discussion above). In order to perform reconciliation with invoices from the network carrier, the amount of data transfer is normally saved for an additional one or two billing cycles.

Table 2 illustrates how data transfer categories can be prioritized when multiple users are enabled. As can be seen in Table 2, the invention provides an extremely flexible method of selecting which applications are first allowed to use available bandwidth. Table 2 also illustrates how a priority of 0 may be configured for a user. In preferred embodiments, a configured priority of 0 is used when all data transfers of that category and user are to be blocked.

TABLE 2

Multiple User Configured Priority

| Application Category | Upload Priority (0-20) | Download Priority (0-20) |
| --- | --- | --- |
| User 1 HTTP | 19.5 | 10 |
| User 1 FTP | 15 | 18 |
| User 1 Instant Messaging | 17 | 17 |
| User 1 P2P | 12 | 15 |
| User 1 NNTP | 8 | 14 |
| User 1 Other | 13 | 13 |
| User 2 HTTP | 13.5 | 14 |
| User 2 FTP | 5 | 8 |
| User 2 Instant Messaging | 7 | 7 |
| User 2 P2P | 0 | 0 |
| User 2 NNTP | 1 | 4 |
| User 2 Other | 3 | 3 |
| User 3 HTTP | 14.5 | 16 |
| User 3 FTP | 10 | 13 |

TABLE 2-continued

Multiple User Configured Priority

| Application Category | Upload Priority (0-20) | Download Priority (0-20) |
| --- | --- | --- |
| User 3 Instant Messaging | 12 | 12 |
| User 3 P2P | 7 | 10 |
| User 3 NNTP | 6 | 9 |
| User 3 Other | 4 | 5 |

EXAMPLE

Weighting Factor Prioritized Bandwidth Limiting

In additional embodiments of the invention, data transfer prioritized by a weighting factor. Weighting factors form a convenient method of managing data transfer priorities with multiple users and application categories. Table 3 illustrates an example of weighting factors consisting of the sum of individual user assignments. In its most convenient form, a priority number is assigned to each

TABLE 3

Weighting Factor Direct Value Assignment

| Priority Category | Priority Value - User 1 | Priority Value - User 2 |
| --- | --- | --- |
| User | User 1 = 10 | User 2 = 5 |
| Application Category | P2P Upload = 6 | HTTP Upload = 13.5 |
| Peak period | Peak priority = 12 | Peak priority = 2 |
| Off-Peak period | Peak priority = 10 | Peak priority = 2 |
| Sum of Priority Assignments (Peak) | 28 | 27 |
| Sum of Priority Assignments (Off-Peak) | 26 | 27 |

In the example of Table 3, user 1 has a resultant higher priority during peak periods and user 2 has a higher priority during off-peak periods.

Weighting factors can be assigned directly as exemplified in Table 3, or assigned in an indexing scheme. One example of an indexing scheme is illustrated in Table 4. Each component of the weighting factors has an index table. Instead of entering a priority value as in Table 3, an index number is entered.

When numerous users are included in the priority table, many will share the same indices. The actual priority value associated with any particular priority index is configured by the "master" user. Preferably, a level of security is added so that changes to the priority indices are restricted for only master user access.

TABLE 4

Weighting Factor Indexed Value Assignment

| Priority Category | Priority Value Index | Priority Value |
| --- | --- | --- |
| User - Master | 1 | 99 |
| User - Management | 2 | 50 |
| User - Engineer | 3 | 40 |
| User - Accounting | 4 | 38 |
| User - Production | 5 | 40 |
| User - Other | 6 | 20 |
| User - Disabled | 7 | -99 |
| Peak Period - High | 1 | 20 |
| Peak Period - Medium | 2 | 15 |
| Peak Period - Low | 3 | 5 |

TABLE 4-continued

Weighting Factor Indexed Value Assignment

| Priority Category | Priority Value Index | Priority Value |
|---|---|---|
| Peak Period - Disabled | 7 | −99 |
| P2P Download - High | 1 | 20 |
| P2P Download - Medium | 2 | 15 |
| P2P Download - Low | 3 | 5 |
| P2P Download - Disabled | 7 | −99 |

By using indices, a master user can quickly modify the relative priority of a group of similar users and applications. For example, peer-to-peer applications may be disabled as a group, by assigning a very low priority value (or negative value) to peer-to-peer applications. Similarly, low priority users may be disabled as a group by assigning a very low priority value (or negative value) to the index for that category of users.

EXAMPLE

Quality of Service Bandwidth Limiting

For illustration, this example refers to quality of service (QoS) specific to cable networks. Similar techniques are enabled for other network services, for example digital subscriber line service (DSL). This example uses the multiple QoS offered by many network carriers as a means of controlling the amount of data transfer.

Every cable modem establishes a primary service flow in both the upstream and downstream directions. Referring to FIG. 1, the primary flows maintain connectivity between the cable modem 14 and CMTS 21 at all times. In addition, a DOCSIS version 1.1 cable modem can establish multiple secondary service flows. The secondary service flows either can be permanently created (they persist until the cable modem is reset or powered off) or can be created dynamically to meet the needs of the on-demand traffic being transmitted.

Each service flow has a set of QoS attributes associated with it. These QoS attributes define a particular class of service and determine characteristics such as the maximum bandwidth for the service flow and the priority of its traffic. The class of service attributes can be inherited from a preconfigured CMTS local service class (class-based flows), or they can be individually specified at the time of the creation of the service flow. The QoS attributes of a service flow can be specified in two ways: either explicitly by defining all attributes, or implicitly by specifying a service class name. A service class name is a string that the CMTS associates with a QoS parameter set.

Any service flow can have its QoS parameter set specified in any of three ways:
1. Explicitly including all traffic parameters;
2. Indirectly referring to a set of traffic parameters by specifying a service class name; or
3. Specifying a service class name along with modifying parameters.

In this example, QoS parameters are utilized for reducing bandwidth consumption. First the monitoring component of the invention determines the amount of accumulated data transfers. This amount is then compared to the configured control curve to determine the available current bandwidth (difference between the control curve and accumulated data transfers for current billing cycle).

When the accumulation exceeds the control curve, available current bandwidth becomes a negative number. In this instance a lower QoS is requested. When available bandwidth later becomes positive, a higher QoS is requested or QoS is requested to reset to initial values.

Requests for lower quality of service (QoS) are preferably associated with a means to prevent frequent cycling between high and low QoS. Examples of such means include requiring a minimum available bandwidth before a higher QoS can be requested; requiring positive available bandwidth amount for a configured period of time before a higher QoS can be requested; and applying data smoothing to the measuring component of the invention.

The trigger points for requesting higher and lower QoS may also be user configurable. This allows, for example, the selection of lower QoS as the control curve is approached but before its current value is exceeded. Similarly the request for higher QoS may have a trigger point below the control curve.

The present invention may also combine QoS bandwidth limiting with other bandwidth controlling methods of the invention. For example, QoS bandwidth limiting may be used as a first level of control action to reduce data transfer amounts. Should the data transfer accumulation approach the control curve when lowest quality of service is in effect, an secondary (or tertiary) control method can be configured to prevent exceeding the control curve.

EXAMPLE

Model Predictive Bandwidth Limiting

This example uses model predictive control algorithms as a means of controlling the amount of data transfer. The state of the art for model predictive control (MPC) and adaptive predictive control (APC) is disclosed in U.S. Pat. No. 6,532,454 to Werbos. The distinction between MPC and APC is often a matter of industry convention. Both MPC and APC use a model of a process response to determine the desired control actions to initiate. As used herein, model predictive control refers to using a pre-determined model of a process with a control algorithm. Similarly, as used herein, adaptive predictive control refers to using a self-learning model of a process with a control algorithm. Self-learning models include adaptive control, linear adaptive control, nonlinear adaptive control, neural extensions, learning-based approximate dynamic programming, reinforcement learning, neurodynamic programming, neural adaptive control, and the like.

As used herein "model predictive bandwidth limiting" stands for methods of limiting bandwidth by combining the use of control curves and measuring component of the invention with forward-predictive modeling derived from MPC and APC arts.

Important to this example, is the use of forward-predictive modeling to predict the end of billing period data transfer accumulation (predicted accumulation). The final accumulation is next compared to the control curve. When the predicted accumulation exceeds the control curve, data transfer is blocked based upon user configured priorities.

An extension of this technique is to allow an adaptive model to subtotal the predicted accumulation by process type, user, etc. The monitoring component then provides graphical representation of the various data transfer usages. These graphs have been found very convenient by users interested in reducing ultimate bandwidth consumption.

As compared to the other prior examples, model predictive bandwidth limiting relies less upon the form of the control curve. In fact, the use of a fixed control curve (see, for example, FIG. 7A) is often adequate. The reason for this distinction is that the model predictive bandwidth limiting extrapolates current data transfer accumulation forward to the end of billing cycle. In the other examples of bandwidth limiting, no extrapolation of data transfer occurs and a compensating control curve is required.

The present invention may also combine model predictive bandwidth limiting with other bandwidth controlling methods of the invention. For example, model predictive bandwidth limiting may be used as a first level of control action to reduce data transfer amounts. Should the data transfer accumulation approach the control curve when lowest quality of service is in effect, a secondary (or tertiary) control method can be configured to prevent exceeding the control curve.

Although the present invention has been described in terms of specific embodiments, various types of general purpose or specialized computer apparatus may be used with or perform operations in accordance with the teachings described herein. For example, the present invention can be run as a program when the terminal means comprise central processing units, or alternately, be embedded into the firmware of a terminal means. Additionally, the claims should not be read as limited to the described order or elements unless stated to that effect. Therefore, all embodiments that come within the scope and spirit of the following claims and equivalents thereto are claimed as the invention. The scope of the invention is only to be limited by the following claims:

What is claimed is:

1. A method for monitoring packet usage of a local network, wherein the local network is connected to an external network and wherein the local network is subject to policies established by the external network, the method comprising:
   detecting from within the local network packet usage at a terminal means connected to the local network over an increment of time measured from a start time;
   grouping from within the local network packets according to selection criteria established within the local network;
   obtaining from within the local network a count of packets in each packet grouping for the time increment;
   aggregating from within the local network the packet count of the packet groupings for the time increment to derive a total packet count;
   establishing from within the local network a control curve, wherein the control curve represents a packet volume over a time period, wherein the time period is measured from the start time and wherein the time period is greater than or equal to the time increment;
   establishing from within the local network an alarm threshold relative to the control curve;
   comparing from within the local network the total packet count to the control curve;
   determining from within the local network whether the total packet count equals or exceeds the alarm threshold; and
   issuing from within the local network an alarm to a user of the terminal means when the total packet count equals or exceeds the alarm threshold.

2. The method of claim 1, wherein grouping packets according to selection criteria comprises grouping upstream packets transmitted by the terminal means and wherein the control curve comprises an upstream packet volume over the time period.

3. The method of claim 1, wherein the alarm is selected from the group consisting of an audio tone and an electronic message.

4. The method of claim 1, wherein grouping packets according to selection criteria comprises grouping downstream packets received by the terminal means and wherein the control curve comprises a downstream packet volume over the time period.

5. The method of claim 1, further comprising:
   establishing from within the local network an action threshold relative to the control curve;
   comparing from within the local network the total packet count to the control curve;
   determining from within the local network whether the total packet count equals or exceeds the action threshold; and
   taking from within the local network a control action when the total packet count equals or exceeds the action threshold.

6. The method of claim 5, wherein the control action is selected from the group consisting of reducing packets transmitted by the terminal means, reducing packets transmitted by the terminal means for the user of the terminal means, reducing packets received by the terminal means, and reducing packets received by the terminal means for the user of the terminal means.

7. The method of claim 1, wherein grouping packets according to selection criteria comprises identifying applications operating on the terminal means by type and wherein the control curve comprises a packet volume over the time period for all the application types operating on the terminal means.

8. The method of claim 7, further comprising:
   assigning from within the local network a priority to an application type;
   establishing from within the local network an action threshold relative to the control curve;
   comparing from within the local network the total packet count of all of the application types operating on the terminal means to the control curve;
   determining from within the local network whether the total packet count for all of the application types equals or exceeds the action threshold; and
   taking from within the local network a control action when the total packet count equals or exceeds the action threshold in accordance with the assigned priority.

9. The method of claim 8, wherein the control action is selected from the group consisting of reducing packets by application type and blocking packets by application type.

10. The method of claim 1, wherein the alarm threshold relative to the control curve is selected from the group consisting of a packet usage volume for the time increment, a packet usage expressed as a percentage below the control curve for the time increment, and a packet usage expressed as a percentage above the control curve for the time increment.

11. The method of claim 1, wherein the terminal means is selected from the group consisting of a terminal, a personal computer, a game console, and a VoIP telephone system.

12. The method of claim 1, wherein the control curve is selected from the group of control curves consisting of linear control curve, elevated zero time intercept linear control curve, elevated zero time intercept linear control curve with configured allowed overage, and elevated zero time intercept linear control curve with closed periods.

13. The method of claim 1, wherein the time period is a billing cycle.

* * * * *